United States Patent
Kadowaki et al.

(10) Patent No.: US 7,794,602 B2
(45) Date of Patent: Sep. 14, 2010

(54) METHOD OF PURIFYING LIQUOR

(75) Inventors: Toshio Kadowaki, Osaka (JP); Takao Nakahara, Tokyo (JP)

(73) Assignee: Otsuka Foods Co., Ltd., Osaka (JP)

( * ) Notice: Subject to any disclaimer, the term of this patent is extended or adjusted under 35 U.S.C. 154(b) by 368 days.

(21) Appl. No.: 11/887,955

(22) PCT Filed: Apr. 8, 2005

(86) PCT No.: PCT/JP2005/006950

§ 371 (c)(1),
(2), (4) Date: Oct. 5, 2007

(87) PCT Pub. No.: WO2006/114847

PCT Pub. Date: Nov. 2, 2006

(65) Prior Publication Data

US 2009/0026142 A1  Jan. 29, 2009

(51) Int. Cl.
*B01D 37/02* (2006.01)
*B01D 37/03* (2006.01)
*C12G 3/12* (2006.01)

(52) U.S. Cl. ............ 210/702; 210/723; 210/728; 210/730; 210/778; 210/908; 210/912; 426/11; 426/493

(58) Field of Classification Search ............ 210/778
See application file for complete search history.

(56) References Cited

U.S. PATENT DOCUMENTS

| 3,007,878 A | 11/1961 | Alexander et al. ....... 252/313 |
| 5,433,865 A * | 7/1995 | Laurent ................... 210/727 |
| 7,048,859 B1 * | 5/2006 | Moffett .................... 210/714 |

FOREIGN PATENT DOCUMENTS

| JP | 59-205975 A | 11/1984 |
| JP | 60-94081 A | 5/1985 |
| JP | 61-289876 A | 12/1986 |
| JP | 63-137668 A | 6/1988 |
| JP | 2-174654 A | 7/1990 |
| JP | 3-42008 A | 2/1991 |
| JP | 3-187374 A | 8/1991 |
| JP | 4-270107 A | 9/1992 |
| JP | 8-322547 A | 12/1996 |
| JP | 10-337402 A | 12/1998 |
| JP | 11-253541 A | 9/1999 |
| JP | 2004-181406 A | 7/2004 |
| JP | 2005-137264 A | 6/2005 |

* cited by examiner

*Primary Examiner*—Peter A Hruskoci
(74) *Attorney, Agent, or Firm*—Kubovcik & Kubovcik

(57) ABSTRACT

Disclosed herein is a purification method characterized by adding a chitosan powder or a chitosan-coated substance, and optionally further adding a silica sol to liquor and filtering the mixture by a filter machine to remove unsaturated fatty acids, compounds of unsaturated fatty acids with metal ions, or fusel oil from the liquor.

8 Claims, No Drawings

METHOD OF PURIFYING LIQUOR

TECHNICAL FIELD

The present invention relates to a method of purifying liquor by removing unsaturated fatty acids, compounds of unsaturated fatty acids with metal ions, or fusel oil from the liquor.

BACKGROUND ART

When unsaturated fatty acid ethyl esters contained in liquor are oxidized during storage or by exposure to direct light, an oily smell is produced. In particular, liquor produced by atmospheric distillation contain large amounts of unsaturated fatty acids that are precursors of materials producing an oily smell. When unsaturated fatty acid ethyl esters (especially, ethyl linoleate) are decomposed by oxidation and converted into oily smell components, these components cannot be easily removed from the liquor because they have solubility several thousands times higher than that before decomposition.

Further, higher fatty acid ethyl esters such as ethyl palmitate and ethyl linoleate give a rich taste and mildness to liquor, but on the other hand cause the production of not only an oily smell but also lees. In particular, when such higher fatty acid esters are reacted with metal ions, compounds of unsaturated fatty acids with metal ions are produced as a flocculent precipitate. The metal ions are derived from metals (e.g., copper) used in a distiller.

In order to suppress the production of such a flocculent precipitate, the following method is generally employed: diluting water called "Warimizu" is added to liquor, and the liquor is left standing overnight to produce turbidity and is then filtered to remove turbidity.

However, even when such a method is employed, precursors of materials producing lees cannot be sufficiently removed. This causes a problem that turbidity resulting from fusel oil that is a higher alcohol and/or unsaturated fatty acids occurs when the filtered liquor is further subjected to filtration after storage in a tank or the like. More specifically, such turbidity occurs when the liquor is mixed with water contained in a filter machine so that the alcohol content of the liquor is decreased or when the alcohol in a filter machine is collected by water driving at the end of filtration so that the alcohol content of the liquor is decreased.

Patent Document 1: Japanese Patent Application Laid-open No. H8-322547

Patent Document 2: U.S. Pat. No. 3,007,878

Patent Document 3: Japanese Patent Application Laid-open No. H4-270107

DISCLOSURE OF THE INVENTION

It is therefore an object of the present invention to provide a method of purifying liquor whereby unsaturated fatty acids contained in the liquor and responsible for the production of an oily smell can be reduced and the production of a flocculent precipitate and turbidity resulting from fusel oil and/or unsaturated fatty acids can be prevented.

A first aspect of the present invention is directed to a method of purifying liquor including adding a chitosan powder or a chitosan-coated substance to liquor and filtering the mixture by a filter machine to remove unsaturated fatty acids, compounds of unsaturated fatty acids with metal ions, or fusel oil from the liquor.

The Patent Document 1 discloses a method of removing protein from liquid materials such as Japanese Sake by the use of a silica sol and/or chitosan, but there is no description about the removal of unsaturated fatty acids and the like from liquor.

A second aspect of the present invention is directed to a method of purifying liquor including filtering liquor by a filter machine whose filtration surface has a chitosan powder or a chitosan-coated substance attached thereto to remove unsaturated fatty acids, compounds of unsaturated fatty acids with metal ions, or fusel oil from the liquor.

A third aspect of the present invention is directed to a method of purifying liquor including adding a chitosan powder or a chitosan-coated substance and a silica sol to liquor to remove unsaturated fatty acids, compounds of unsaturated fatty acids with metal ions, or fusel oil from the liquor.

A fourth aspect of the present invention is directed to a method of purifying liquor including adding a positively-charged silica sol to the liquor to remove unsaturated fatty acids, compounds of unsaturated fatty acids with metal ions, or fusel oil from the liquor.

According to the method of purifying liquor of the present invention, it is possible to suppress the production of an oily smell in liquor and to efficiently remove turbidity from the liquor.

BEST MODE FOR CARRYING OUT THE INVENTION

Chitosan to be used in the present invention is known as a deacetylated product of chitin and is not particularly limited, but preferably has a degree of deacetylation of 70% or higher, more preferably 85% or higher. In addition, the chitosan is preferably used in the form of a fine powder.

A chitosan-coated substance to be used in the present invention is obtained by dissolving chitosan in an acid solution such as lactic acid, acetic acid, or hydrochloric acid, and then adding a core material such as activated carbon, cellulose, or diatomite and further adding an aqueous alkali solution such as sodium hydroxide or potassium hydroxide thereto to deposit the chitosan on the surface of the core material. The amount of chitosan coating of the chitosan-coated substance is not particularly limited, but is usually in the range of 5 to 300 parts by weight per 100 parts by weight of the core material.

According to the first aspect of the present invention, the amount of the chitosan powder or the chitosan-coated substance to be added to liquor is preferably in the range of about 10 to 5,000 g per ton of the liquor.

According to the second aspect of the present invention, liquor is filtered by a filter machine whose filtration surface has the chitosan powder or the chitosan-coated substance attached thereto. The filtration surface having the chitosan powder or the chitosan-coated substance attached thereto can be obtained by circulating, in the filter machine, a mixture previously prepared by mixing the chitosan powder or the chitosan-coated substance with water in a basin-like vessel (called "Hangire") having a volume of about 200 to 500 liters so that the chitosan powder or the chitosan-coated substance can be evenly attached to the filtration surface. The amount of the chitosan powder or the chitosan-coated substance attached to the filtration surface is preferably in the range of about 50 to 400 g per square meter of the area of the filtration surface.

According to the third aspect of the present invention, the chitosan powder or the chitosan-coated substance and a silica sol are added to liquor. As the silica sol, either a negatively-charged silica sol or a positively-charged silica sol can be used. In general, a silica sol usually used is negatively charged. A positively-charged silica sol will be described in detail later.

According to the third aspect of the present invention, the amount of the chitosan powder or the chitosan-coated substance to be added to the liquor is preferably in the range of 10 to 5,000 g per ton of the liquor. The amount of the silica sol to be added to the liquor is preferably determined so that the concentration of the silica sol in the liquor will lie in the range of 50 to 2,000 ppm. By adding such amounts of the chitosan powder or the chitosan-coated substance and the silica sol to the liquor, it is possible to efficiently remove unsaturated fatty acids, compounds of unsaturated fatty acids with metal ions, and fusel oil from the liquor.

According to the fourth aspect of the present invention, a positively-charged silica sol is added to liquor. The amount of the positively-charged silica sol to be added to the liquor is preferably determined so that the concentration of the silica sol in the liquor will lie in the range of 50 to 2,000 ppm. By adding such a concentration of a positively-charged silica sol to the liquor, it is possible to efficiently remove unsaturated fatty acids, compounds of unsaturated fatty acids with metal ions, and fusel oil from the liquor. In Particular, such a method according to the fourth aspect of the present invention is preferably employed to remove white turbidity caused by adding diluting water called "Warimizu". Such turbidity results from fusel oil or unsaturated fatty acids, and therefore can be efficiently removed by this method.

The positively-charged silica sol to be used in the present invention is a silica sol containing colloidal silica particles whose surface is positively charged. In general, the colloidal silica is an acidic oxide, and therefore the surface of colloidal silica particles is negatively charged. However, by coating the negatively-charged surface of the colloidal silica particles with, for example, a fine metal compound having positive charges, it is possible to obtain positively-charged colloidal silica. Examples of such a metal compound having positive charges include basic metal oxides such as alumina (aluminum oxide), iron oxide, zirconia (zirconium oxide), and titanium oxide. Among these basic metal oxides, alumina is most preferred from practical and economical viewpoints.

Examples of a method of coating the negatively-charged surface of colloidal silica particles with a fine metal compound having positive charges include spraying, vacuum deposition, thermal impregnation, and hydrolysis. Preferred is a method in which a negatively-charged silica sol and one or two or more kinds of aqueous basic metal chloride salt solutions are mixed, and the thus obtained mixture is adjusted to an appropriate pH with an acid and/or an alkali to deposit a hydrolysate of the basic metal chloride salt on the negatively-charged surface of the silica particles in the silica sol. As for the basic metal chloride salt to be used, basic aluminum chloride is used in the case of coating with alumina, basic iron chloride is used in the case of coating with iron oxide, basic zirconium chloride is used in the case of coating with zirconia, and basic titanium chloride is used in the case of coating with titanium oxide. Such a coating method by hydrolysis is described in detail in, for example, Patent Documents 2 and 3. It is to be noted that a metal oxide deposited by hydrolysis is preferably a fine amorphous hydrated metal oxide.

The amount of the metal compound having positive charges, such as a metal oxide, for coating the colloidal silica is preferably in the range of about 2 to 40 wt % with respect to the amount of the colloidal silica. If the amount of the metal compound coating is less than 2 wt %, there is a case where it is impossible to sufficiently give positive charges. On the other hand, if the amount of the metal compound coating exceeds 40 wt %, there is a case where part of the basic metal oxide or the like cannot be attached to the surface of silica particles in the silica sol or an economic disadvantage is caused.

The average particle size of the positively-charged silica sol to be used in the present invention is preferably in the range of about 3 to 100 nm, more preferably in the range of about 5 to 50 nm. The silica ($SiO_2$) content in the positively-charged silica sol is preferably in the range of about 15 to 45 wt %, more preferably in the range of about 15 to 30 wt %.

The average particle size of the negatively-charged silica sol to be used in the present invention is preferably in the range of about 3 to 100 nm, more preferably in the range of about 5 to 50 nm. The silica content in the negatively-charged silica sol is preferably in the range of 10 to 50 wt %, more preferably in the range of about 15 to 45 wt %.

An example of a commercially-available positively-charged silica sol includes "COPOROC 200" (manufactured by Otsuka Foods Co., Ltd.), and an example of a commercially-available negatively-charged silica sol includes "COPOROC 300" (manufactured by Otsuka Foods Co., Ltd.).

According to the purification method of the present invention, one or two or more materials selected from, for example, proteins such as gelatin, collagen, fish gelatin, milk-derived protein, wheat protein, and pea protein, polysaccharides such as sodium alginate, carrageenan, and agar, tannin materials such as persimmon tannin and tannic acid, PVPP (polyvinyl polypyrrolidone), silicon dioxide such as silica gel, filter aids such as diatomite, pearlite, and cellulose, adsorbents such as bentonite, activated carbon, acid clay, ion-exchange resins can be used together as long as the effect of the present invention is not impaired.

Examples of liquor to which the present invention can be applied include not only liquors such as Shochu-group A, Shochu-group B, mixtures of Shochu-group A and Shochu-group B, Awamori, brandy, whiskey, bourbon, and Scotch whiskey but also products obtained by aging these liquors in oak barrels, products obtained by soaking plants such as ume, Asian ginseng, and herb in these liquors, and products obtained by soaking animals such as pit vipers and Habu snakes in these liquors.

EXAMPLES

Hereinbelow, the present invention will be described in detail with reference to the following examples, but is not limited thereto.

Example 1

200 mL of rice Shochu (alcohol content: 31%) aged 2 years with an oily smell was placed in a beaker, 1 g of a chitosan powder (average molecular weight based on viscometric method: 150,000, mesh size: 40 mesh pass) was added to the rice Shochu, and the mixture was stirred to prepare a sample.

Comparative Example 1

A sample of Comparative Example 1 was prepared in the same manner as in the Example 1 except that addition of the chitosan powder was omitted.

Each of the rice Shochu samples of the Example 1 and the Comparative Example 1 was filtered through No. 5C filter paper to obtain filtrate. Then, the turbidity of the filtrate was measured with a turbidimeter (manufactured by Nippon Denshoku K.K. under the trade name of "NDH-20D"), and the presence or absence of an oily smell was determined. The measurement results are shown in Table 1.

TABLE 1

| | Turbidity of Filtrate | Presence or Absence of Oily Smell |
|---|---|---|
| Example 1 | 0.7% | Absent |
| Comparative Example 1 | 4.6% | Present |

As can be seen from Table 1, the purifying method according to the present invention can reduce the turbidity of liquor and can remove an oily smell from the liquor.

Example 2

200 mL of a commercially-available rice Shochu (alcohol content: 25%) was placed in a beaker, 0.2 g of a chitosan powder (average molecular weight based on viscometric method: 150,000, mesh size: 40 mesh pass) and 800 ppm of a silica sol (manufactured by Otsuka Foods Co., Ltd. under the trade name of "COPOROC 200") was added to the rice Shochu, and the mixture was stirred to prepare a sample.

Comparative Example 2

A sample of Comparative Example 2 was prepared in the same manner as in the Example 2 except that addition of the chitosan powder and the silica sol was omitted.

The rice Shochu samples of the Example 2 and the Comparative Example 2 were left standing for 24 hours, and then the amount of lees settled in each sample was measured and the turbidity of each sample was measured using the turbidimeter described above. The measurement results are shown in Table 2.

TABLE 2

| | Turbidity | Amount of Lees Settled |
|---|---|---|
| Example 2 | 0.1% | 2.0% |
| Comparative Example 2 | 3.8% | 0% |

As can be seen from Table 2, the purifying method according to the present invention can reduce the turbidity of liquor.

Example 3

Diluting water called "Warimizu" was added to rice Shochu having an alcohol content of 35% to reduce its alcohol content to 25% so that white turbidity was produced. 200 mL of the thus obtained whitish rice Shochu was placed in a beaker, and then 1,000 ppm of a positively-charged silica sol (manufactured by Otsuka Foods Co., Ltd. under the trade name of "COPOROC 200" and having a silica content of 20 wt %) was added to the rice Shochu, and the mixture was stirred to prepare a sample.

Comparative Example 3

A sample of Comparative Example 3 was prepared in the same manner as in the Example 3 except that addition of the silica sol was omitted.

The rice Shochu samples of the Example 3 and the Comparative Example 3 were left standing for 24 hours, and then the amount of lees settled in each sample was measured and the turbidity of each sample was measured using the turbidimeter described above. The measurement results are shown in Table 3.

TABLE 3

| | Turbidity | Amount of Lees Settled |
|---|---|---|
| Example 3 | 0.8% | 3.8% |
| Comparative Example 3 | 15.3% | 1.5% |

As can be seen from table 3, the purifying method according to the present invention can reduce the turbidity of liquor.

Example 4

Diluting water called "Warimizu" was added to rice Shochu having an alcohol content of 35% to reduce its alcohol content to 25% so that white turbidity was produced. The thus obtained whitish rice Shochu was filtered through a Buchner funnel with No. 5C filter paper pre-coated with diatomite (manufactured by US Celite Corporation under the trade name of "Celite Hyflo Super-Cel") to obtain filtrate. Then, water was added to the filtrate to adjust its alcohol content to 3% so that the turbidity of the filtrate was increased. To 200 mL of the thus obtained filtrate, 1 g of a chitosan powder (average molecular weight based on viscometric method: 150,000, mesh size: 40 mesh pass) was added, and the mixture was stirred to prepare a sample.

Comparative Example 4

A sample of Comparative Example 4 was prepared in the same manner as in the Example 4 except that addition of the chitosan powder was omitted.

Each of the rice Shochu samples of the Example 4 and the Comparative Example 4 was filtered through No. 5C filter paper to obtain filtrate, and then the turbidity of the filtrate was measured. The measurement results are shown in Table 4.

TABLE 4

| | Turbidity |
|---|---|
| Example 4 | 0.2% |
| Comparative Example 4 | 7.8% |

As can be seen from Table 4, the purifying method according to the present invention can reduce the turbidity of liquor.

The invention claimed is:

1. A method of purifying liquor comprising adding a chitosan powder or a chitosan-coated substance to the liquor, said liquor having an alcohol content produced by distillation, and filtering the mixture by a filter machine to remove unsaturated fatty acids, compounds of unsaturated fatty acids with metal ions, or fusel oil from the liquor.

2. The method according to claim 1, wherein the liquor is selected from the group consisting of Shochu, Awamori, brandy, whiskey, bourbon and Scotch whiskey.

3. A method of purifying liquor comprising filtering the liquor, said liquor having an alcohol content produced by distillation alcoholic beverage, by a filter machine whose filtration surface has a chitosan powder or a chitosan-coated substance attached thereto to remove unsaturated fatty acids, compounds of unsaturated fatty acids with metal ions, or fusel oil from the liquor.

4. The method according to claim 3, wherein the liquor is selected from the group consisting of Shochu, Awamori, brandy, whiskey, bourbon and Scotch whiskey.

5. A method of purifying liquor comprising adding a chitosan powder or a chitosan-coated substance and a silica sol to the liquor, said liquor having an alcohol content produced by distillation, to remove unsaturated fatty acids, compounds of unsaturated fatty acids with metal ions, or fusel oil from the liquor.

6. The method according to claim 5, wherein the liquor is selected from the group consisting of Shochu, Awamori, brandy, whiskey, bourbon and Scotch whiskey.

7. A method of purifying liquor comprising adding a positively-charged silica sol to the liquor, said liquor having an alcohol content produced by distillation, to remove unsaturated fatty acids, compounds of unsaturated fatty acids with metal ions, or fusel oil from the liquor.

8. The method according to claim 7, wherein the liquor is selected from the group consisting of Shochu, Awamori, brandy, whiskey, bourbon and Scotch whiskey.

\* \* \* \* \*